(12) United States Patent
Barrera et al.

(10) Patent No.: US 7,306,828 B2
(45) Date of Patent: Dec. 11, 2007

(54) FABRICATION OF REINFORCED COMPOSITE MATERIAL COMPRISING CARBON NANOTUBES, FULLERENES, AND VAPOR-GROWN CARBON FIBERS FOR THERMAL BARRIER MATERIALS, STRUCTURAL CERAMICS, AND MULTIFUNCTIONAL NANOCOMPOSITE CERAMICS

(75) Inventors: Enrique V. Barrera, Houston, TX (US); Leonard Lee Yowell, Jr., Houston, TX (US); Brian Mitchell Mayeaux, Houston, TX (US); Erica L. Corral, Houston, TX (US); Joseph Cesarano, III, Albuquerque, NM (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 11/316,124

(22) Filed: Dec. 22, 2005

(65) Prior Publication Data

US 2007/0228317 A1 Oct. 4, 2007

Related U.S. Application Data

(63) Continuation of application No. 10/366,183, filed on Feb. 13, 2003, now abandoned.

(60) Provisional application No. 60/419,346, filed on Oct. 18, 2002, provisional application No. 60/357,048, filed on Feb. 14, 2002.

(51) Int. Cl.
*C23C 4/10* (2006.01)
*C04B 35/78* (2006.01)

(52) U.S. Cl. ............... 427/427; 427/450; 427/453; 252/62; 416/241 B; 501/95.2; 501/99; 501/100; 501/80

(58) Field of Classification Search ............. 501/95.2, 501/99, 100, 101; 427/427, 249.3, 249.4, 427/450, 453; 252/62; 977/1
See application file for complete search history.

(56) References Cited

U.S. PATENT DOCUMENTS

| | | | |
|---|---|---|---|
| 5,420,081 A | 5/1995 | Mattes et al. | |
| 5,965,470 A | 10/1999 | Bening et al. | |
| 6,027,326 A | 2/2000 | Cesarano et al. | |
| 6,255,241 B1 * | 7/2001 | Miyazawa et al. | 501/99 |
| 6,316,048 B1 * | 11/2001 | Steibel et al. | 427/180 |
| 6,420,293 B1 | 7/2002 | Chang et al. | |
| 6,492,014 B1 | 12/2002 | Rolison et al. | |
| 6,495,483 B1 | 12/2002 | Keller et al. | |
| 6,528,190 B1 * | 3/2003 | Campbell et al. | 428/701 |
| 6,770,583 B2 | 8/2004 | Keller | |
| 6,783,745 B1 | 8/2004 | Voronov et al. | |
| 6,875,374 B1 * | 4/2005 | Zhan et al. | 252/502 |
| 6,976,532 B2 * | 12/2005 | Zhan et al. | 165/185 |
| 2004/0150140 A1 | 8/2004 | Zhan et al. | |
| 2004/0265489 A1 * | 12/2004 | Dubin | 427/212 |
| 2005/0181209 A1 * | 8/2005 | Karandikar | 428/408 |

OTHER PUBLICATIONS

Nakano et al., "Fabrication and Characterization of Three-Dimensional Carbon Fiber Reinforced Silicon Carbide and Silicon Nitride Composites," J. Am. Ceram. Soc., 78(10), 2811-2814 (1995).
Guo et al., "Carbon fibre-reinforced silicon nitride composite," J. Mater. Sci. 17, 3611-3616 (1982).
Grenet et al., "Carbon Fibre-Reinforced Silicon Nitride Composites by slurry Infilitration," Ceramic Transactions, 58, 125-130 (1995).
Iijima, "Helical microtubules of graphitic carbon," Nature, 354, 56-58 (1991).
Thostenson et al., "Advances in the science and technology of carbon nanotubes and their composites: a review," Composites Science and Technology, 61, 1899-1912 (2001).
Yakobson et al., "Nanomechanics of carbon tubes: instabilities beyond linear response," Physical Review Letters, 76(14), 2511-2514 (1996).
Walters et al., "Elastic Strain of Freely Suspended Single Walled Carbon Nanotube ropes," Applied Physics Letters, 74(25), 3803-3805 (1999).
Falvo et al., "Bending and Buckling of Carbon Nanotubes Under large Strain," Nature, 389, 582-584 (1997).
Wildoer et al., "Electronic Structure of Atomically Resolved Carbon Nanotubes," Nature, 391, 59-62 (1998).
Calvert, "A Recipe for Strength," Nature, 399, 210-211 (1999).
Ma et al., "Processing and properties of carbon nanotubes-nano-SiC ceramic," Journal of Materials Science, 33, 5243-5246 (1998).
Zhan et al., "Single-wall carbon nanotubes as attractive toughening agents in alumina-based nanocomposites," Nature Materials, 2, 38-42 (2003).
Peigney et al., "Carbon Nanotubes in novel Ceramic Matrix Composites," Ceramics International, 26, 677-683 (2000).
Flahaut et al., "Carbon Nanotube-Metal-Oxide Nanocomposites: Microstructure, Electrical Conductivity and Mechanical Properties," Acta Mater., 48, 3803-3812 (2000).
Hwang et al., "Carbon nanotube reinforced ceramics," J. Mater. Chem., 11, 1722-1725 (2001).
Hone et al., "Electrical and thermal transport properties of magnetically aligned single wall carbon nanotube films," Appl. Phys. Lett., 77, 666-668, (2000).
Walters et al., "In-plane-aligned membranes of carbon nanotubes," Chem. Phys. Lett., 338, 14-20 (2001).
Yu et al., "Thermal conductivity of single crystal C60," Phys. Rev. Lett., 68, 2050-2053 (1992).

(Continued)

*Primary Examiner*—Karl Group
(74) *Attorney, Agent, or Firm*—Robert C. Shaddok; Winstead P.C.

(57) ABSTRACT

The present invention is directed towards a ceramic nanocomposite comprising a nanostructured carbon component inside a ceramic host. The ceramic nanocomposite may further comprise vapor grown carbon fibers. Such nanostructured carbon materials impart both structural and thermal barrier enhancements to the ceramic host. The present invention is also directed towards a method of making these ceramic nanocomposites and for methods of using them in various applications.

12 Claims, 20 Drawing Sheets

OTHER PUBLICATIONS

Rao et al., "Zirconia nanotubes," Chem. Comm., 1581 (1997).
R. Taylor, The Chemistry of the Fullerenes, World Scientific Press, River Edge, NJ, 1995.
O'Connell et al., "Reversible water-solubilization of single-walled carbon nanotubes by polymer wrapping," Chem. Phys. Lett., 342, 265-271 (2001).
Liu et al. "Fullerene Pipes," Science, 280, 1253-1256 (1998).
Bahr et al., "Covalent chemistry of single-wall carbon nanotubes," J. Mater. Chem., 12, 1952-1958 (2002).
Cesarano et al., "Processing of Highly Concentrated Aqueous alpha-Alumina Suspensions Stabilized with Polyelectrolytes," J. Am. Ceram. Soc., 71 (12), 1062-1067 (1998).
He et al., "Robocasting and Mechanical Testing of Aqueous Silicon Nitride Slurries," Proceeding of the Materials Research Society, 627-635, (2000).
Sun et al., "Colloidal Processing of Carbon Nanotube/Alumina Composites," 14 Chem. Mater. (2002), pp. 5169-5172.

* cited by examiner

FABRICATION OF REINFORCED COMPOSITE MATERIAL COMPRISING CARBON NANOTUBES, FULLERENES, AND VAPOR-GROWN CARBON FIBERS FOR THERMAL BARRIER MATERIALS, STRUCTURAL CERAMICS, AND MULTIFUNCTIONAL NANOCOMPOSITE CERAMICS

CROSS REFERENCE TO RELATED APPLICATIONS

The present application is a continuation application of U.S. application Ser. No. 10/366,183, filed Feb. 13, 2003 now abandoned which in turn claims priority to the following provisional applications: U.S. application No. 60/357,048, filed Feb. 14, 2002, and U.S. application No. 60/419,346, filed Oct. 18, 2002, both of which are incorporated herein by reference in their entirety.

FEDERALLY SPONSORED RESEARCH

This invention was made with Government support under the following grant numbers: N00014-97-1-0391 and N00014-99-1-0246 awarded by the Office of Naval Research, NSF HDR-9817555 awarded by the National Science Foundation, and TDT 003604-0039-2001 awarded by the Texas Higher Education Coordinating Board. The Government may have certain rights with respect to this invention.

BACKGROUND

1. Field of the Invention

In general terms, the present invention relates to materials science, high-performance materials, ceramic composites, and carbon nanotubes. More specifically, the present invention is for a composition of matter and for a processing method comprising nanostructured carbon materials and/or vapor-grown carbon fibers (VGCFs) and a ceramic material wherein the resulting nanocomposite materials have enhanced structural and thermal barrier properties.

2. Description of the Related Art

Ceramic materials possess many attractive properties, such as good high temperature mechanical strength, high resistance to creep, resistance to oxidation and chemical attack, but they still need improved toughness values in order to make them advanced structural materials. Some researchers have already shown improved toughness values for silicon nitride. (Nakano et al., "Fabrication and Characterization of Three-Dimensional Carbon Fiber Reinforced Silicon Carbide and Silicon Nitride Composites," *J. Am. Ceram. Soc.*, 78(10), 2811-2814 (1995); Guo et al., "Carbon fibre-reinforced silicon nitride composite," *J. Mater. Sci.* 17, 3611-3616 (1982); Grenet et al., "Carbon Fibre-Reinforced Silicon Nitride Composites by slurry Infiltration," *Ceramic Transactions*, 58, 125-130 (1995)) through the use of carbon fibers as reinforcements. Presently, ever since the discovery of carbon nanotubes (CNTS) (Iijima, "Helical microtubules of graphitic carbon," *Nature*, 354, 56-58 (1991)) their use as reinforcements in composite systems has been the focus of many research efforts (Thostenson et al., "Advances in the science and technology of carbon nanotubes and their composites: a review," *Composites Science and Technology*, 61, 1899-1912 (2001), incorporated herein by reference). CNTs are the ideal fiber reinforcement for composite systems because of their outstanding mechanical properties (Yakobson et al., "Nanomechanics of carbon tubes: instabilities beyond linear response," *Physical Review Letters*, 76(14), 2511-2514 (1996); Walters et al., "Elastic Strain of Freely Suspended Single Walled Carbon Nanotube ropes," *Applied Physics Letters*, 74(25), 3803-3805 (1999)), flexibility (Falvo et al., "Bending and Buckling of Carbon Nanotubes Under large Strain," *Nature*, 389, 582-584 (1997)), and electronic properties (Wildoer et al., "Electronic Structure of Atomically Resolved Carbon Nanotubes," *Nature*, 391, 59-62 (1998)). They have a very high aspect ratio (length-to-diameter ratio) but are short enough to flow through conventional processing equipment, such as in the fabrication of polymer matrix composite systems (Calvert, "A Recipe for Strength," *Nature*, 399, 210-211 (1999) and, as will be discussed later, CNT/ceramic composite systems fabricated by robocasting. CNTs can also serve as a new reinforcement to improve the brittleness of ceramic materials. Ma et al., "Processing and properties of carbon nanotubes-nano-SiC ceramic," *Journal of Materials Science*, 33, 5243-5246 (1998), incorporated herein by reference, have fabricated-carbon nanotube-nano-SiC ceramic composites via a hot-press method. Three-point bending strength and fracture toughness values of these composites show a 10% increase over the monolithic SiC ceramic, which was fabricated under the same process. Further increases in toughness are possible if lower temperature processing is used (Zhan et al., "Single-wall carbon nanotubes as attractive toughening agents in alumina-based nanocomposites," *Nature Materials*, 2, 38-42 (2003), incorporated herein by reference).

Piegney et al. developed a novel catalysis method for the in situ production of dispersed CNT bundles within a $CNTs-Fe-Al_2O_3$ composite powder (Peigney et al., "Carbon Nanotubes in novel Ceramic Matrix Composites," *Ceramics International*, 26, 677-683 (2000), incorporated herein by reference). The composite powders were then hot-pressed at 1475° C. in a primary vacuum and, after hot-pressing, evidence of CNT bundle survival was found and the mechanical properties of the ceramic were retained (Flahaut et al., "Carbon Nanotube-Metal-Oxide Nanocomposites: Microstructure, Electrical Conductivity and Mechanical Properties," *Acta Mater.*, 48, 3803-3812 (2000), incorporated herein by reference). Hwang and Hwang (Hwang et al., "Carbon nanotube reinforced ceramics," *J. Mater. Chem.*, 11, 1722-1725 (2001), incorporated herein by reference) have studied the dispersion of CNTs using surfactants in order to achieve high levels of dispersion in their CNT reinforced ceramic system. Their study shows that surfactant molecules and CNTs form co-nicelle structures, which they used as templates to synthesize $SiO_2$—CNT microrods that were used as reinforcements to inorganic ceramics. Their mechanical strength measurements of silicon dioxide ceramic were enhanced by ~100% in the presence of ~6 wt. % of CNTs.

Single-wall carbon nanotubes (SWNTs) possess highly anisotropic thermal properties. Theoretical calculations as well as some initial experimental efforts (Hone et al., "Electrical and thermal transport properties of magnetically aligned single wall carbon nanotube films," *Appl. Phys. Lett.*, 77, 666-668, (2000); Walters et al., "In-plane-aligned membranes of carbon nanotubes," *Chem. Phys. Lett.*, 338, 14-20 (2001)) have demonstrated that the longitudinal thermal conductivity is very high and within an order of magnitude of graphite or diamond (~2000 W/mK). In the transverse direction, the thermal conductivity is low and similar to that of $C_{60}$ (0.4 W/mK) (Yu et al., "Thermal conductivity of single crystal $C_{60}$," *Phys. Rev. Lett.*, 68, 2050-2053

(1992)). Rao et al. (Rao et al., "Zirconia nanotubes," *Chem. Comm.*, 1581 (1997), incorporated herein by reference) demonstrated that multi-walled carbon nanotubes could be coated with zirconia precursors and then burned out to leave behind nanoscale ceramic template structures.

Ceramic materials are also widely used as thermal barrier materials due to their refractory nature and low degree of thermal conductivity. Ceramics, however, are inherently brittle. Adding components to the ceramics which will enhance the materials' toughness while maintaining or enhancing the thermal barrier properties of the material would be a significant and useful advance. While such a decrease in the thermal conductivity of a thermal barrier material is alone worthwhile, the combination of decreased thermal conductivity coupled with increased toughness associated with the ceramic nanocomposites of the present invention represents a substantial improvement in the art of thermal barrier materials, particularly those that must perform in demanding applications such as those found in power turbine machinery. To date, there is no eligible prior art which discloses putting fullerene materials in ceramic matrices to form nanocomposites which have enhanced thermal barrier properties relative to the ceramic precursors. The present invention is directed towards such nanocomposites such that they can have a superior thermal, mechanical, and electrical properties as appropriate for particular applications.

SUMMARY

The present invention provides for a ceramic nanocomposite comprising a ceramic host material and a nanostructured carbon material selected from the group consisting of carbon nanotubes, single-wall carbon nanotubes, vapor grown carbon fibers, fullerenes, buckyballs, carbon fibrils, buckyonions, metallofullerenes, endohedral fullerenes, and combinations thereof. In some embodiments of the present invention, the nanostructured carbon material serves to decrease the thermal conductivity of the ceramic host. In some embodiments, it does this by serving as a phonon scattering center. In other embodiments, it decreases the thermal conductivity by altering the structure of the ceramic host. In some embodiments of the present invention, at least some of the nanostructured carbon material present imparts greater structural integrity to the ceramic host. A ceramic nanocomposite, according to the present invention, can exist in the form of coatings, bulk objects, and combinations thereof.

The ceramic host of the nanocomposite of the present invention can be any ceramic which suitably provides for the nanocomposite material of the present invention. Suitable ceramics include, but are not limited to, zirconia, alumina, silica, titania, yttria, ceria, boron nitride, carbon nitride, silicon nitride, silicon carbide, tantalum carbide, tungsten carbide, and combinations thereof.

In some embodiments of the present invention, the nanostructured carbon material comprises single-wall carbon nanotubes which may, or may not, be in the form of short "pipes." In some embodiments, the nanostructured carbon material is present in an amount which ranges generally from at least about 0.001 weight percent to at most about 50 weight percent, but preferably ranges from at least about 0.1 weight percent to at most about 30 weight percent of the final product. In some embodiments, the nanostructured carbon material is modified by a chemical means to yield derivatized nanostructured carbon material. Here, "derivatization" is taken to mean attachment of other chemical entities to the nanostructured carbon material. This attachment may be by chemical or physical means including, but not limited to, covalent bonding, van der Waals forces, electrostatic forces, physical entanglement, and combinations thereof. In other embodiments, the nanostructured carbon material is modified by a physical means selected from the group consisting of plasma treatment, heat treatment, ion bombardment, attrition by impact, milling and combinations thereof. In other embodiments, the nanostructured carbon material is modified by a chemical means selected from the group consisting of chemical etching by acids either in liquid or gaseous form, chemical etching by bases either in liquid or gaseous form, electrochemical treatments, and combinations thereof. In some embodiments of the present invention, the ceramic nanocomposite has a bulk porosity which ranges from at least about 1 percent to at most about 60 percent.

The present invention is directed at a method for making ceramic nanocomposites comprising a nanostructured carbon component and a ceramic host component. Such a method comprises the steps of: a) preparing a slurry comprising ceramic particles and solvent; b) adding nanostructured carbon materials such that they become dispersed in the slurry; c) shape-forming the slurry into a green body of specific shape; and, optionally, d) firing and/or sintering the green body. The solvent used to prepare the slurry can be selected from the group consisting of aqueous solvents, non-aqueous solvent, and combinations thereof. Such solvents include, but are not limited to, water, toluene, ethyl alcohol, trichloroethylene, methyl ethyl ketone, and combinations thereof. In some embodiments, the step of preparing the slurry further comprises adding a dispersal agent. Such dispersal agents include, but are not limited to, natural formulations, synthetic formulations, polyelectrolyte dispersants, surfactants, wrapping polymers, and combinations thereof. In some embodiments, the step of preparing the slurry further comprises adding binding agents and/or plasticizers.

In some embodiments of the present invention, the step of adding the nanostructured carbon materials (note that this step can be combined with the step of preparing the slurry) to the slurry further comprises the utilization of dispersion assistance to facilitate dispersion. In some embodiments, this step further comprises a milling operation, and possibly a nanomilling operation.

In some embodiments of the present invention, the step of shape-casting the slurry into a green body (also known as a green state) comprises a casting technique. Suitable casting techniques include, but are not limited to, tape casting, spin casting, solid casting, slip casting, robocasting, and combinations thereof. In some embodiments, there is a solvent removal process which occurs before, after, or during the formation of the green body. In some embodiments, there is a de-airing process which occurs before, after, or during the formation of the green body. In some embodiments, there is a binder burnout step which occurs after the formation of the green body and before the optional sintering process. In some embodiments, the binder burnout step is integral to the sintering process, but generally occurs in the temperature range of at least about 100° C. to at most about 500° C. Such sintering processes serve to fuse the ceramic together and are carried out at temperatures which range from at least about 500° C. to at most about 2500° C. Methods of sintering include, but are not limited to, spark plasma sintering, microwave sintering, gas pressure sintering, pressureless sintering, and combinations thereof.

The present invention is directed to a method for making ceramic nanocomposites comprising the steps of: a) dry milling ceramic particles together with nanostructured carbon materials to form a powdered mixture; b) adding solvent to the powdered mixture to form a slurry; c) shape-forming the slurry into a green body; and, optionally, d) sintering the green body. The present invention is also directed towards making a ceramic nanocomposite utilizing a sol-gel technique comprising the steps of: a) preparing a ceramic sol-gel; b) incorporating nanostructured carbon material into the sol-gel to form a composite sol-gel; c) shape-forming the composite sol-gel into an object; and, optionally, d) sintering the shape-formed object. In some embodiments, the step of shape-forming comprises a gel casting technique. Here, a "sol-gel" technique is one which provides for a ceramic component first as a solution or "sol" of precursors which is hydrolyzed and polymerized into a "gel." Thus, the term, "sol-gel" represents the material at any stage of its transformation from a solution to a gel.

The present invention is directed at a method of making powdered forms of ceramic nanocomposite material comprising the steps of: a) preparing a slurry comprising ceramic particles and solvent; b) adding nanostructured carbon materials such that they become dispersed in the slurry; c) sintering the slurry of ceramic particles and nanostructured carbon materials to form a bulk ceramic nanocomposite; d) grinding the bulk ceramic nanocomposite; and e) ball-milling the ground bulk ceramic nanocomposite to form a powdered ceramic nanocomposite. The present invention is also directed at a method of making powdered forms of ceramic nanocomposite material comprising the steps of: a) preparing a ceramic sol-gel; b) incorporating nanostructured carbon material into the sol-gel to form a composite sol-gel; c) sintering the composite sol-gel to form a bulk ceramic nanocomposite; d) grinding the bulk ceramic nanocomposite; and e) ball-milling the ground bulk ceramic nanocomposite to form a powdered ceramic nanocomposite. The present invention is also directed towards a method of making coatings and objects by spraying these ceramic nanocomposite powders with a technique selected from the group consisting of plasma spraying, thermal spraying, powder spraying, electrostatically-assisted powder spraying, and combinations thereof.

The present invention is directed towards a method of using ceramic nanocomposites in applications requiring thermal barrier materials and in applications requiring material properties selected from the group consisting of thermally insulating, electrically conducting, mechanically robust, and combinations thereof.

DETAILED DESCRIPTION OF THE PREFERRED EMBODIMENTS

Figure 1:
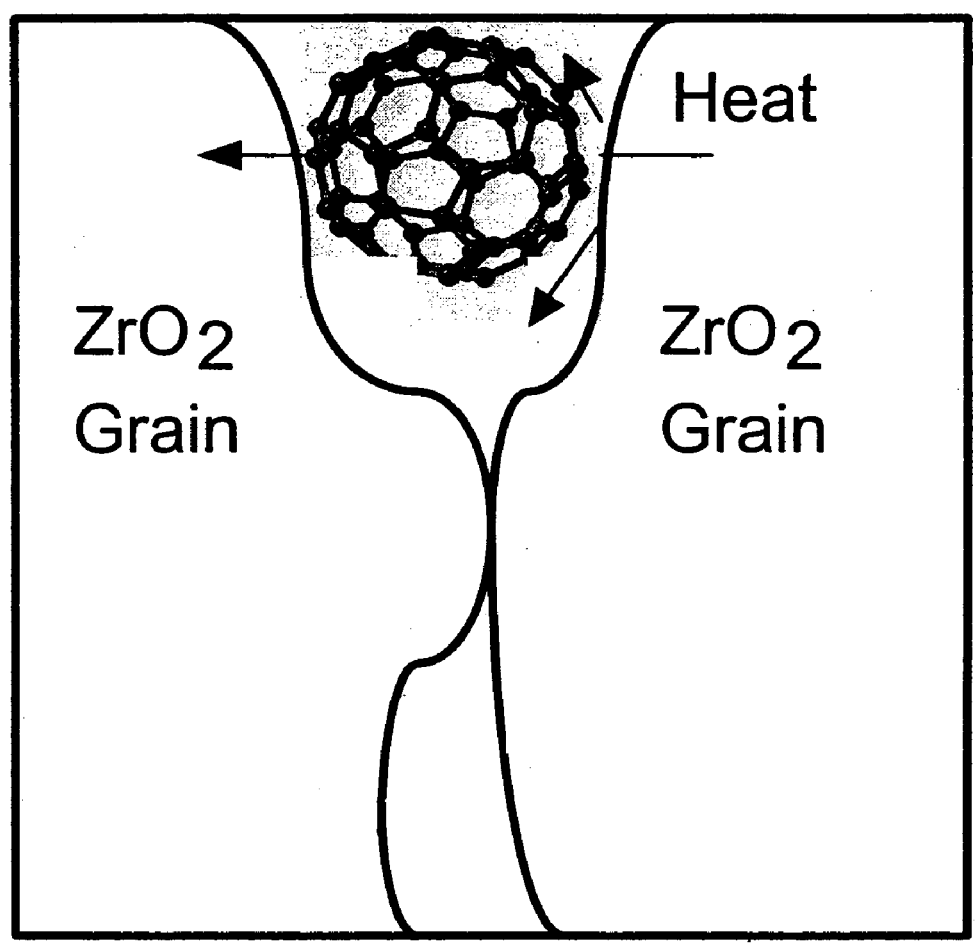
FIG. 1. $C_{60}$ molecules serve as point defects which effectively scatter thermal phonons when dispersed among ceramic grains at their grain boundaries.

In the present invention, vapor grown carbon fibers (VGCFs) and carbon nanotubes (CNTs) are dispersed in the matrices of ceramic hosts to provide for high toughness ceramic nanocomposites. Carbon nanotubes, according to the present invention, comprise multi- and single-wall carbon nanotubes (MWNTs and SWNTs, respectively), and combinations thereof. In some preferred embodiments, the materials of the present invention are employed as coatings, whereas in other embodiments they are shape-formed into objects. In some embodiments, the final object is a powder. In some embodiments, tape casting is used. In other embodiments, a free form fabrication technique like robocasting may be used. By using robocasting, basic processing is taken to a higher level in that a manufacturing method is identified for isolating the manufacture of ceramic nanocomposites comprising VGCFs, CNTs, and combinations thereof. Robocasting is a relatively new method for manufacturing ceramics, but one that lends itself to processing with nanofillers and with remote processing capability.

In some preferred embodiments of the present invention, nanostructured carbon materials are used to enhance the thermal barrier characteristics of the ceramic host by decreasing the thermal conductivity of the material. Nanostructured carbon materials, according to the present invention, comprise SWNTs, MWNTs, VGCFs, fullerene molecules, endohedral fullerenes, metallofullerenes, carbon fibrils, buckyonions, nested fullerenes, and combinations thereof. Fullerenes comprise all-carbon molecules like those described in R. Taylor, *The Chemistry of the Fullerenes*, World Scientific Press, River Edge, N.J., 1995, which is incorporated herein by reference.

Often times, the thermal behavior of a material is governed by phonon contributions and at other times (such as at temperatures in excess of about 300° C.) radiation effects have to be considered. Various models have been produced that demonstrate that porous media can influence these competing factors and can reduce the thermal conductivity by introducing phonon scattering centers. In some embodiments of the present invention, nanostructured carbon materials are dispersed into the ceramic matrix to provide such phonon scattering centers. Here, they work in concert with other physical aspects of the ceramic host material (like grain boundaries, porosity, etc.) to scatter phonons, alter the nature of the porosity, contribute to an extended grain boundary region, serve as the basis for polycrystalline templates, and enhance the amorphous-like nature of the resulting ceramic nanocomposite. Thus, their presence ultimately serves to decrease the thermal conductivity and correspondingly enhance the overall thermal barrier properties of the resulting nanocomposite material. Phonon scattering is important at low-intermediate temperatures (e.g., 0° C.-500° C.). At higher temperatures, typically greater than 500° C., factors such as microstructure, nanostructure and microscale porosity, caused by the presence of nanostructured carbon materials, become increasingly responsible for reductions in thermal conductivity.

Thus, the present invention is directed to the dispersal of CNTs and VGCFs in a ceramic matrix wherein the CNTs and VGCFs enhance the resulting ceramic nanocomposite's toughness and also provide phonon scattering centers which enhance the thermal barrier properties of the resulting ceramic nanocomposite. Such thermal barrier enhancement can also be achieved by the addition of fullerene molecules (or other nanostructured carbon materials) to the ceramic matrix. This can be done with or without CNTs or VGCFs being present to enhance the resulting ceramic nanocomposite's structural properties. In either case, a ceramic nanocomposite is produced which possesses thermal barrier properties which are superior to those of the unmodified host ceramic material. A preferred fullerene (based primarily on cost factors and availability) for use in the present invention is buckminsterfullerene, $C_{60}$. In addition to possessing low intrinsic thermal conductivity, $C_{60}$ molecules have been found to act as point defects and scatter phonons effectively when dispersed among ceramic grains (See FIG. 1), significantly reducing thermal conductivity at low and intermediate temperatures. Low temperatures, according to the present invention range generally from at least about 0° C. to at most about 100° C. Intermediate temperatures, according to the present invention range from at least about 100° C. to at most about 500° C.

In general terms, methods of making ceramic nanocomposites comprising nanostructured carbon materials according to the present invention, comprise the steps of: a) providing a slurry comprising a solvent and ceramic particles which preferably range in size from at least about 10 nanometers (nm) to at most about 1 micron (μm); b) adding fullerene materials, VGCFs, and combinations thereof such that they become dispersed in the slurry using traditional ceramic processing techniques or colloidal processing techniques; c) shape-forming the slurry into a "green body" of specific shape; and, optionally, d) sintering the resulting shape-formed object into a final product.

Solvents used in preparing the slurry can be any solvent which suitably provides for a slurry according to the present invention and can be of an aqueous or non-aqueous nature. Such solvents include, but are not limited to water, toluene, ethyl alcohol, trichloroethylene, methyl ethyl ketone, and combinations thereof. In some embodiments of the present invention, the solvent comprises a wax. In some embodiments, the process of slurry preparation further comprises adding one or more dispersal agents. Dispersal agents can be any species which suitably facilitates the dispersion of the ceramic particles, nanostructured carbon materials, and combinations thereof. Preferred dispersal agents include, but are not limited to polyelectrolyte species, surfactants, natural formulations, synthetic formulations, wrapping polymers (See O'Connell et al., "Reversible water-solubilization of single-walled carbon nanotubes by polymer wrapping," *Chem. Phys. Lett.*, 342, 265-271 (2001), incorporated herein by reference) and combinations thereof. Examples of such dispersal agents include, but are not limited to, Darvan 821A, cetyltrimethylammonium bromide (CTMAB), Menhaden fish oil, sodium dodecyl sulfate, Triton-X100, dodecyloctaethylene glycol ether, octaethylene glycol ether, polyetyleneimine, hexadecanoic acid, and combinations thereof. In some embodiments of the present invention, the step of preparing the slurry further comprises adding an organic binding agent. A binding agent is any species which suitably provides for a binding agent of the present invention and includes, but is not limited to polyvinyl butyral, polymethacrylates, polyethylene, polyvinyl alcohol, and combinations thereof. In some embodiments of the present invention, the ceramic particles and/or nanostructured carbon materials are added with dispersion assistance such as, but not limited to, ultrasonic agitation, shaking, stirring, and combinations thereof. In some embodiments, plasticizers are added to the material slurry comprising ceramic and nanostructured carbon. Plasticizers can be any species which suitably provides for a plasticizer according to the present invention and includes, but is not limited to polyethylene glycol, butylbenzyl phthalate, octyl phthalate, dibutyl phthalate, and combinations thereof. In some embodiments, ball milling is used to further homogenize the components of the slurry. In some embodiments, this milling operation further involves "nanomilling" wherein larger milling components break up smaller ones which in turn act as milling components, and so on. Optionally, the milling operation can be performed dry, prior to adding solvent, on the ceramic particles and/or the nanostructured carbon materials either separately, or as a mixture.

In some embodiments of the present invention, the step of shape forming the slurry into a specific shape comprises a casting technique. A casting technique, according to the present invention, can be any casting technique which suitably provides for the casting of a slurry or sol-gel of the present invention. Preferred casting techniques include, but are not limited to, tape casting, robocasting, gel casting, spin casting, solid casting, slip casting, and combinations thereof. Specific shapes into which the slurry can be formed include, but are not limited to, coatings, films, paints, powders, bulk objects, and combinations thereof. In some embodiments of the present invention, there is a solvent removal process before, after, or during the shape-forming step. This can be facilitated by heating, irradiation, or exposure to vacuum. Suitable heating processes include, but are not limited to, resistive heating, microwave heating, heat lamps, and combinations thereof. In some embodiments of the present invention, there is a de-airing step before, after, or during the shape-forming step. Such a step serves to remove air pockets from the material. In some embodiments of the present invention, there is a binder burnout step after shape-forming the slurry into a specific shape. Such binder burnout serves to remove most of the organic species present in the shape-formed object, but without fully sintering the product. Temperatures for this process are generally in the range of about 100° C. to about 500° C.

In some embodiments of the present invention, the sintering process is carried out in an environment selected from the group consisting of a partial vacuum, an inert atmosphere (e.g., $N_2$, Ar, He, etc.), air, and combinations thereof. Sintering conditions further comprise a temperature generally in the range of at least about 500° C. to at most about 2500° C., and a pressure in the range of at least about $10^{-6}$ torr to at most about $10^6$ torr. Sintering, according to the present invention, can further comprise spark plasma sintering, microwave sintering, gas pressure sintering, pressureless sintering, and combinations thereof.

In some embodiments of the present invention, the nanostructured carbon materials may, or may not, remain in the final ceramic nanocomposite in their original form. This is particularly relevant after high-temperature sintering processes are carried out. It is essential, however, that the nanostructured carbon materials remain intact long enough for the unique nanoporous ceramic structures to be formed within the ceramic nanocomposite. In some embodiments of the present invention, the nanostructured carbon materials may have a sacrificial coating on them that permits their survival at higher processing temperatures. In other embodiments, the nanostructured carbon materials serve as a sacrificial template for creating nanostructures within the resulting ceramic nanocomposite. Some embodiments of the present invention provide for the creation of new, nanostructural and microstructural features or porosity which is advantageous when attempting to reduce or control the thermal conductivity of ceramic insulating materials over a broad temperature range. Considering the high temperature stability of vapor grown carbon fibers (VGCFs), it is possible for some forms of nanostructured carbon materials to remain intact in the final system, but possibly with a ceramic crystalline coating. Either situation should lead to reductions in thermal conductivity.

A ceramic of the present invention can be any ceramic that suitably provides for a ceramic nanocomposite of the present invention. Examples of a suitable ceramic include, but are not limited to, zirconia, aluminina, silica, titania, yttria, ceria, boron nitride, carbon nitride, silicon nitride, silicon carbide, tantalum carbide, tungsten carbide, and combinations thereof. Generally, a ceramic of the present invention, is any material of the type $M_wO_xN_yC_z$, where M is a metal, metalloid, or boron and w, x, y, and z range from 0-10. O, N, and C are the oxygen, nitrogen, and carbon components, respectively. Preferably, the ceramic component is supplied as a fine powder with particle size diameters which range generally from about 1 nanometer to about 10,000 nanometers, and preferably from about 10 nanometers to about 1000 nanometers.

Nanostructured carbon materials can be supplied in a variety of forms which include, but are not limited to, powders, felts, buckypapers, bulk solids, suspensions, solutions, and combinations thereof. The purity of the nanostructured carbon material can be any purity which suitably provides for a ceramic nanocomposite material of the present, invention, and may depend further on the intended application. If the nanostructured carbon materials comprise SWNTs, such nanotubes can be in the form of "ropes" and/or can be in the form of "fullerene pipes" (See Liu et al. "Fullerene Pipes," Science, 280, 1253-1256 (1998), incorporated herein by reference).

A preferred method of adding nanostructured carbon materials to ceramic particles to form a slurry includes an incipient wetness technique. The incipient wetness technique is a method comprising: a) suspending the nanostructured carbon materials in a solvent to form a suspension; b) adding the suspension to ceramic particles to form a slurry; and c) drawing off the solvent leaving nanostructured carbon materials adsorbed onto the surface of the ceramic particles. Dispersal of nanostructured carbon materials within the ceramic host can be can be at any level of dispersion that suitably provides for a resulting ceramic nanocomposite of the present invention. In some embodiments, this dispersion level is dependent upon the desired properties of the resulting ceramic nanocomposite.

In some embodiments of the present invention, chemically derivatized or modified nanostructured carbon materials are used. In addition to facilitating dispersion, such chemical derivatization or modification can enhance bonding of the nanostructured carbon materials within the ceramic matrix. This latter aspect is of particular importance in generating advanced structural materials. In some embodiments, only a portion of the nanostructured carbon materials are derivatized. In some embodiments, derivatized nanostructured carbon materials of one type are added to a ceramic with underivatized nanostructured carbon materials of another type. In some embodiments, a derivatization process (See, as an example, Bahr et al., "Covalent chemistry of single-wall carbon nanotubes," *J. Mater. Chem.*, 12, 1952-1958 (2002), incorporated herein by reference) is used to "patch" reactive defects within the nanostructured carbon materials to render them more inert to the sintering processes that are optionally used. Examples of derivatized (functionalized) nanostructured carbon materials include, but are not limited to, species which have been fluorinated, animated, hydroxylated, alkylated, arylated, carboxylated, alkoxylated, halogenated, sulfonated, nitrated, phosphorylated, wrapped by polymers, protonated, covered in part with species attached by electrostatic means including those of ionic and polarization and van der Waals forces, and combinations thereof.

Embodiments of the present invention comprise a weight percent of the nanostructured carbon component of the composite generally in the range of at least about 0.001 weight percent (wt %) to at most about 50 wt %, and preferably in the range of at least about 0.1 wt % to at most about 30 wt %. An appropriate combination of nanostructured carbon materials and ceramic materials into which the nanostructured carbon material is incorporated is selected to meet the desired thermal and structural requirements for a given end-use or application.

In some embodiments of the present invention, the resulting bulk porosity of the ceramic nanocomposite is of great importance. This porosity can change as a consequence of the sintering conditions. In some exemplary embodiments, the bulk porosity of the ceramic nanocomposite material ranges from at least about 1% to at most about 60%.

In some embodiments of the present invention a sol-gel process is used in which the ceramic component initially comprises an organometallic precursor in solution. This is added to a solution or suspension of nanostructured carbon materials. Such a process greatly facilitates dispersion and eliminates the need for powders, milling processes, etc. A ceramic sol-gel can be any sol-gel which suitably provides for a ceramic nanocomposite of the present invention. While not intending to limit the scope of the invention, an exemplary ceramic sol-gel system involves the following steps: hydrolysis of zirconium-n-propoxide→polymerization→gelation→drying/dehydration→densification/sintering. A solution or suspension of nanostructured carbon materials is preferably added prior to the hydrolysis step to enable optimum dispersion.

For some applications, powdered form(s) of ceramic nanocomposite materials are desirable. For situations such as this, some embodiments employ a procedure that is somewhat modified from the generalized description given previously. In such embodiments, the powder is made by: a) preparing a slurry comprising ceramic particles and solvent; b) adding nanostructured carbon materials such that they become dispersed in the slurry; c) sintering the slurry of ceramic particles and nanostructured carbon materials to form a bulk ceramic nanocomposite; d) grinding the bulk ceramic nanocomposite; and e) ball-milling the ground bulk ceramic nanocomposite to form a powdered ceramic nanocomposite. Alternatively, the powdered ceramic nanocomposite can be made by: a) preparing a ceramic sol-gel; b) incorporating nanostructured carbon materials into the sol-gel during any part of the processing; c) sintering the composite sol-gel to form a bulk ceramic nanocomposite; d) grinding the bulk ceramic nanocomposite; and e) ball-milling the ground bulk ceramic nanocomposite to form a powdered ceramic nanocomposite. Applications in which ceramic nanocomposite powders are advantageous are in plasma spraying or thermal spraying the powders onto a surface to form a coating. Objects can also be fabricated by this reverse-template method whereby an object is sprayed, then the object is removed leaving the ceramic nanocomposite shell.

Possible uses for the present invention include any application where a ceramic material is used to provide mechanical enhancement, namely enhanced toughness and impact strength, and/or where enhanced fracture strength and toughness is desired. A specific application for high-performance ceramic coatings is in coating the metal blades in combustion-driven turbines or in making ceramic parts to guard against impact of various types. Metal oxide ceramics (such as alumina and zirconia) and non-oxide ceramics such as silicon nitride have many demanding applications. The present invention is one in which incorporation of nanostructured carbon materials into a ceramic creates a new material with enhanced thermal and mechanical properties. Additionally, in some embodiments of the present invention, the resulting ceramic nanocomposite material retains the nanostructured carbon materials after firing (binder burnout and sintering), and when the nanostructured carbon materials comprise carbon nanotubes, the nanostructured carbon materials provide electrical conductivity, additional mechanical strength, toughness, and resistance to fracture. The mechanical effect of remaining nanotubes serves to make the resulting ceramic nanocomposite material resistant to flaking behavior and to crack propagation that presently causes failure in some high-performance ceramic parts. Generally, a ceramic nanocomposite of the present invention may find use in any area where high-performance ceramic parts and coatings have application. A particularly useful benefit of a ceramic nanocomposite of the present invention is that the material formed is multi-functional: not only does it have the novel thermal properties stated above, but it also has mechanical strength, toughness, and electrical conductivity that is greater than the pre-existing ceramic parts, and may also possess superior wear properties.

The present invention also builds upon prior art in ceramic coating materials, particularly those used as thermal barriers, and in the incorporation of nanostructured carbon materials into such ceramic coating materials. Possible uses for a composition of the present invention include any application where a ceramic material is used to provide thermal insulation. An application for high-performance ceramic coatings is coating the metal blades in combustion-driven turbines. Such turbines are found in gas-fired electrical generation equipment and jet aircraft engines. The thermal barrier between the hot combustion gases in turbines and the turbine blade metal material is a fundamental limitation to both the rate of energy conversion in a turbine and the lifetime of the turbine under specific operating conditions.

Figure 2:
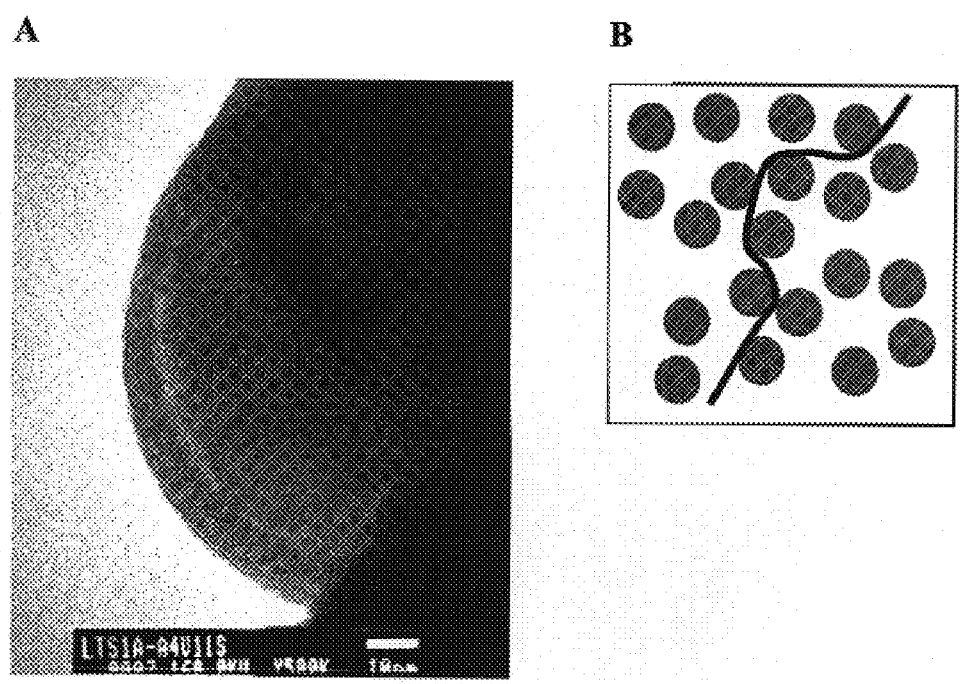
FIG. 2. A) A transmission electron micrograph of single-wall carbon nanotubes forming a "scaffold" around ceramic particles as shown pictorially in B).

Metal oxide ceramics (such as alumina and zirconia) have long been used for thermal barrier coatings in demanding applications. The present invention is one in which incorporation of nanostructured carbon materials in a ceramic host creates a new ceramic nanocomposite material with enhanced thermal barrier properties. Electron micrographs of compositions of the present invention disclose a novel structure wherein, in one particular example, carbon nanotube material appears to serve as a "scaffold" upon which ceramic filaments form (See FIG. 2).

An application for the reduced thermal conductivity ceramics of the present invention (i.e., ceramic nanocomposites) is that of thermal barrier materials (TCMs) and thermal barrier coatings (TBCs) which are used to protect critical components in the hot sections of gas turbine engines. Even small improvements in the thermal properties of TBCs are of interest since turbine blades operate at extreme thermal and mechanical conditions and are very expensive components. Current TBCs are produced by two primary methods: electron beam physical vapor deposition (EBPVD) and plasma spraying. An exemplary method of the present invention for generating such TBCs uses tape casting as a processing route to produce bulk ceramic/nanostructured carbon material composites and as a means to simulate the porous nature of plasma sprayed TBCs. Other embodiments comprise the plasma and/or thermal spraying of ceramic nanocomposite powders to form TBCs.

Advantages of the present invention include the ability to achieve an optimum composition nanostructured carbon/ceramic material, developing application methods appropriate to industrial use of the thermal barrier material produced, and retaining the nanostructured carbon material after the ceramic firing process.

As previously mentioned, a variety of techniques exist for the casting of ceramic nanocomposite materials of the present invention. Robocasting and tape casting are described below in greater detail.

Robocasting

Figure 3:
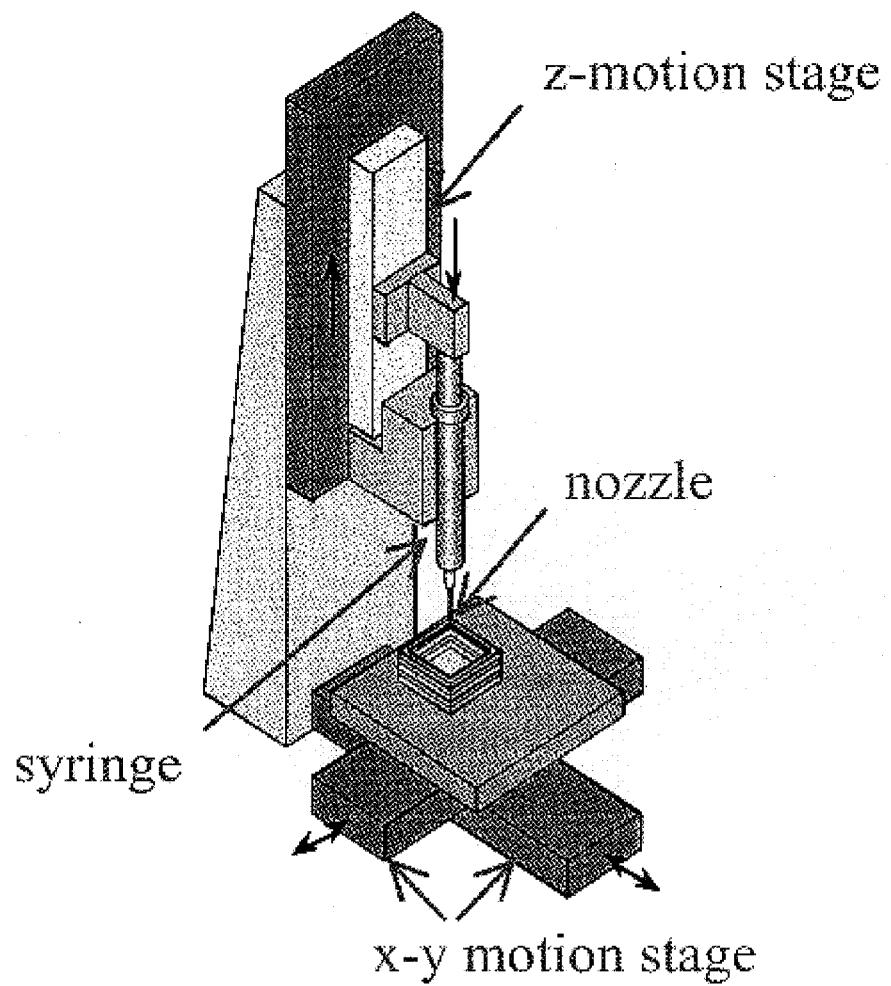
FIG. 3. A schematic of a robocaster building a three-dimensional part.
Figure 4:
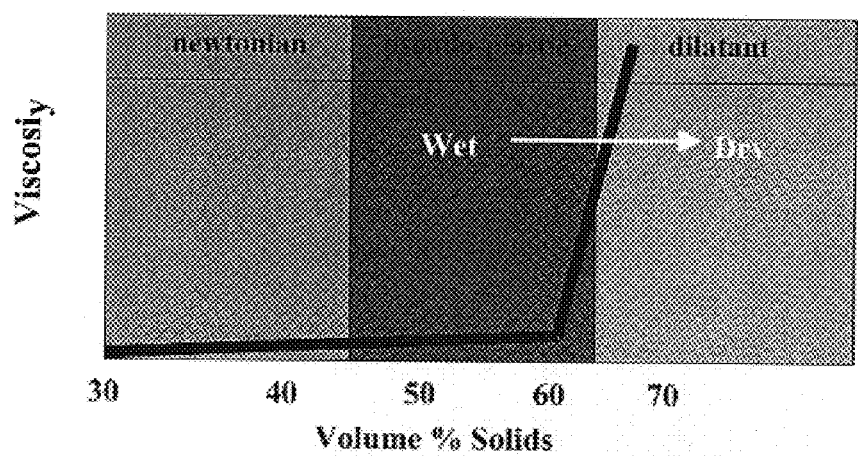
FIG. 4. A schematic showing the typical viscosity versus volume percent solids behavior for alumina loading for dispersed alumina oxide slurries. This identifies the slurry conditions needed for robocasting.

Robocasting is a solid freeform fabrication (SFF) technique for ceramic particles that uses computer controlled layer-wise extrusion of aqueous colloidal suspensions. Techniques currently developed for the rapid prototyping of ceramics primarily use ceramic-loaded polymers or waxes. Robocasting is a preferred method of making ceramic/fullerene material or VGCF composites of the present invention because it requires minimal or no use of organic binders. Therefore binder burnout is not an issue and a dense ceramic part may be free-formed, dried, and sintered in less than 24 hours. The robocasting technique was developed at Sandia National Laboratories (Cesarano et al. "Freeforming Objects with Low-Binder Slurry," U.S. Pat. No. 6,027,326, incorporated herein by reference) and is analogous to the ceramic near-net-shape processing techniques such as, slip casting and gel casting. However, this technique is moldless and fabrication times are often quicker. Robotics are used to control the layerwise deposition of ceramic slurries through an orifice size of from about 100 µm to about 3000 µm. The robocasting process is based on the extrusion of a high solids loading ceramic slurry, around 45-65 volume percent ceramic powder or in combination with a second phase material, <1 volume percent organic additives are added and 35-50 volume percent solvent (usually water) is used. During the robocasting process the build platform moves with respect to the stationary orifice opening. FIG. 3 is a schematic of a robocaster building a solid part, showing the platform movement direction, syringe placement, nozzle and z-direction stage motion. The slurry flowing through the nozzle must be highly concentrated and exhibit a rheology with an appreciable yield stress when at rest but have a shear-thinning behavior upon being sheared. FIG. 4 shows a schematic of the typical viscosity versus volume percent solids behavior for a dispersed aluminum oxide slurry, which is typical of most ceramic behavior. This figure helps to illustrate the transition of the suspension from Newtonian flow to dilatancy as volume percent solids increases. Also note how quickly the change from pseudoplasticity to dilatancy occurs, which is also the processing window used for robocast slurries. A slurry near the dilatant region is needed in order to be able to flow through a small orifice, at an appreciable shear rate (~20 l/s), and onto pre-built layers while having the ability to maintain shape after deposition.

Tape Casting

Tape casting is another preferred casting technique. Tape casting involves the suspension of ceramic particles in a liquid comprising a solvent, dispersant, plasticizer, and binder to form a slurry. In some embodiments, the slurry is ball milled to facilitate dispersion of the components. The viscous slurry, or "slip," is then deposited on a flat surface for the evaporation of the solvent and pressed with a pressure in the range of about 760 torr to about $10^6$ torr. The dried tape can be cut to a desired shape and subjected to a sintering condition to produce a sintered ceramic material. Cracking of tapes is associated with the evaporation of solvent and limits the thickness of zirconia tapes to less than ~200 microns. It is desirable to select a powder with an intermediate specific surface area in order to balance the positive effects of small particle size, and the negative effects of a high surface area powder which cannot be efficiently coated with a binder. Although toluene does not on its own support the dispersion of CNTs, and specifically SWNTs, from their ropes, it has shown utility as a wetting vehicle for the incorporation of CNTs into polymer and ceramic systems (Huang et al.) and is used as a preferred solvent in tape cast formulations of the present invention. Embodiments utilizing SWNTs may have SWNTs which may or may not contain residual metal catalyst particles.

Two distinct heat treatments are typically used in the production of a sintered ceramic body from a tape cast formulation. The first involves the burnout of the binder, plasticizers, and other organic materials, while the second heat treatment step involves the sintering of the ceramic particles to form a more dense ceramic material. Both the burnout and sintering steps comprise: a) an atmosphere; b) a temperature; and c) a pressure, as mentioned previously.

Figure 5:
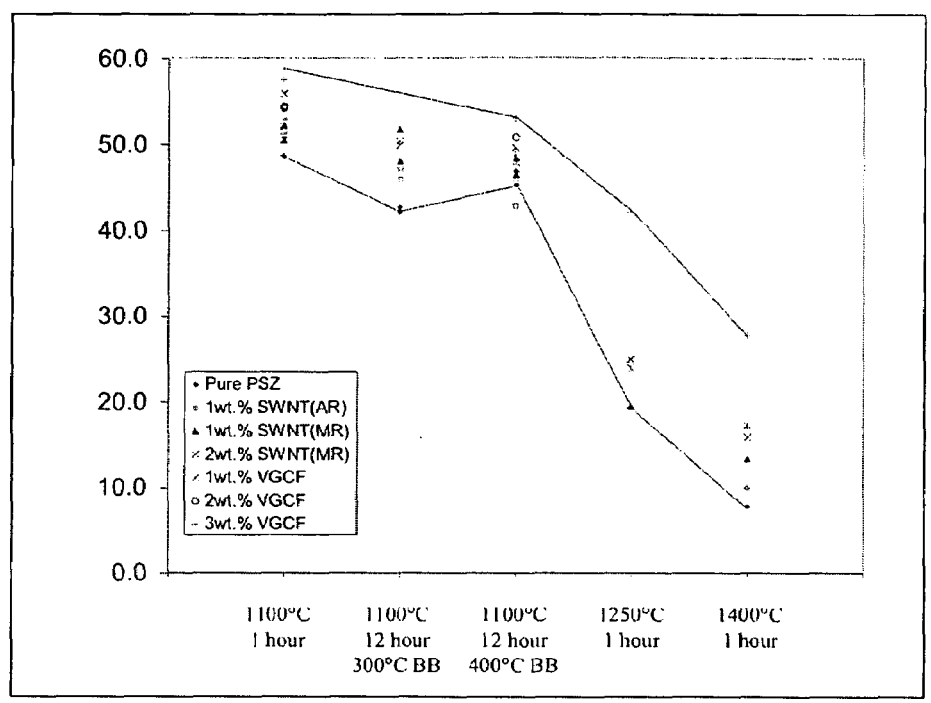
FIG. 5. Plot showing how sintering temperature affects the bulk porosity in the final tape cast ceramic nanocomposite.
Figure 6:
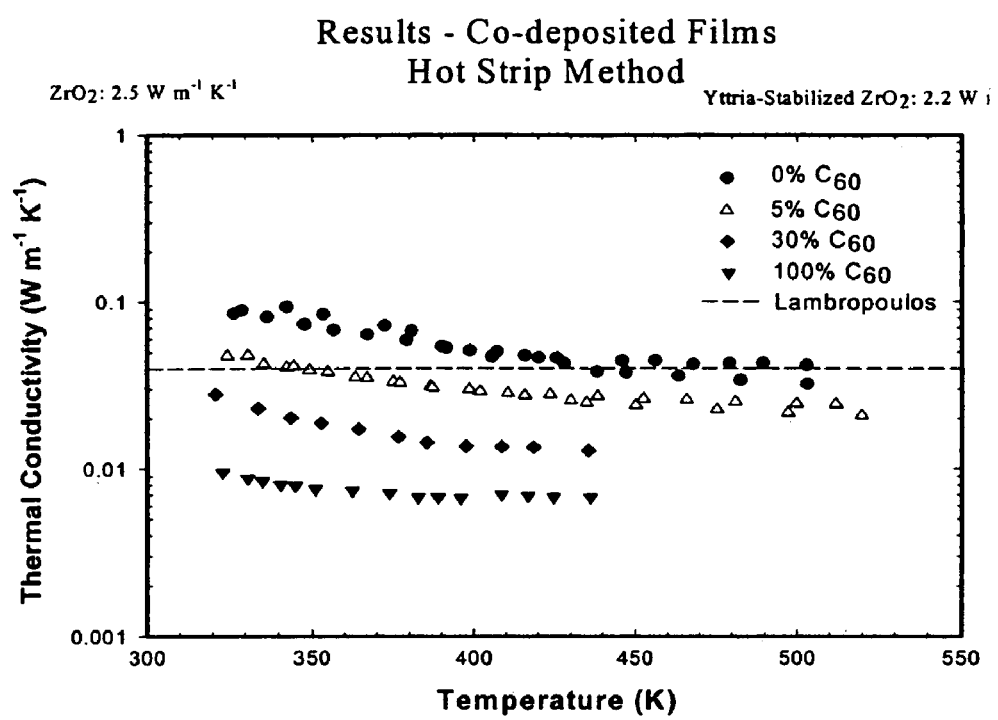
FIG. 6. Reduction of thermal conductivity of partially stabilized zirconia as a result of adding $C_{60}$ at a variety of loadings.
Figure 7:
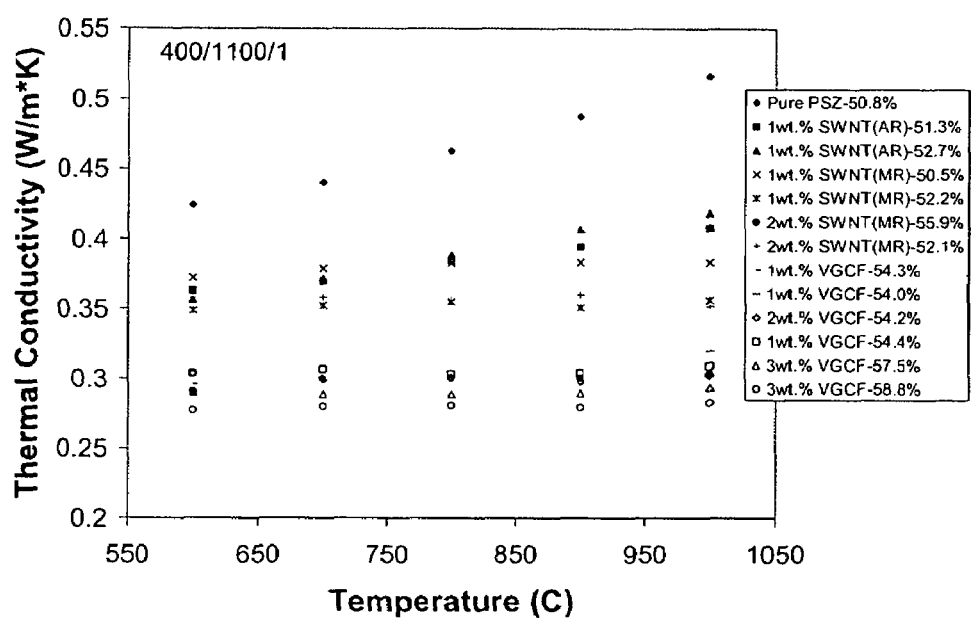
FIG. 7. Reduction of thermal conductivity of partially stabilized zirconia as a result of adding single-wall carbon nanotubes or vapor-grown carbon fibers at a variety of loadings. Post 400° C. binder burnout and 1100° C. sintering for 1 hour.
Figure 8:
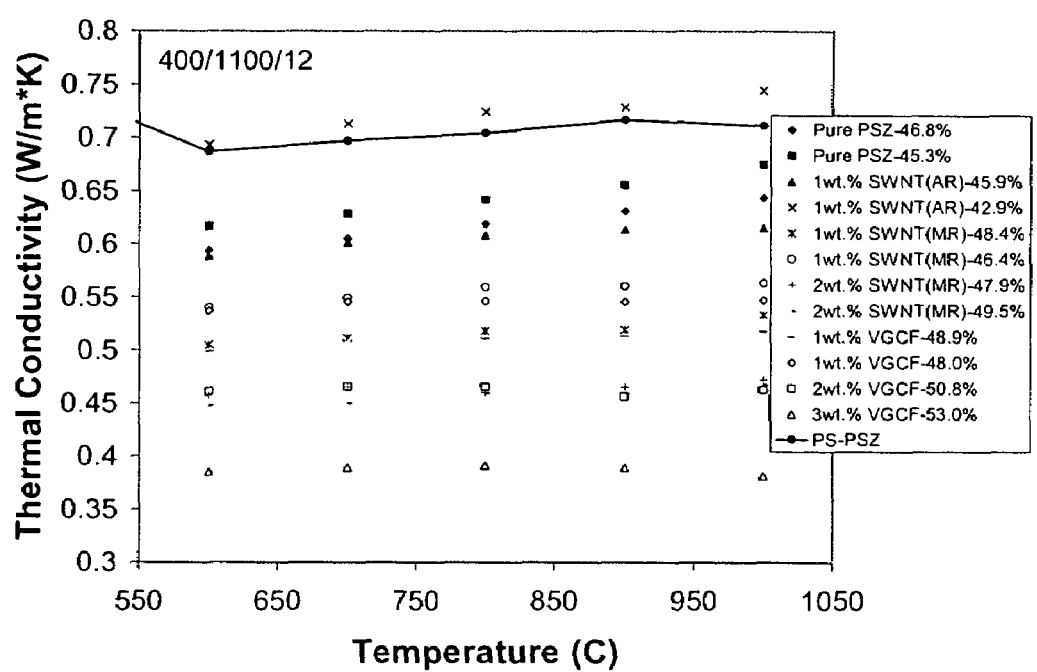
FIG. 8. Reduction of thermal conductivity of partially stabilized zirconia as a result of adding single-wall carbon nanotubes or vapor-grown carbon fibers at a variety of loadings. Post 400° C. binder burnout and 1100° C. sintering for 12 hours. Note black line is for a plasma-sprayed thermal barrier coating.
Figure 9:
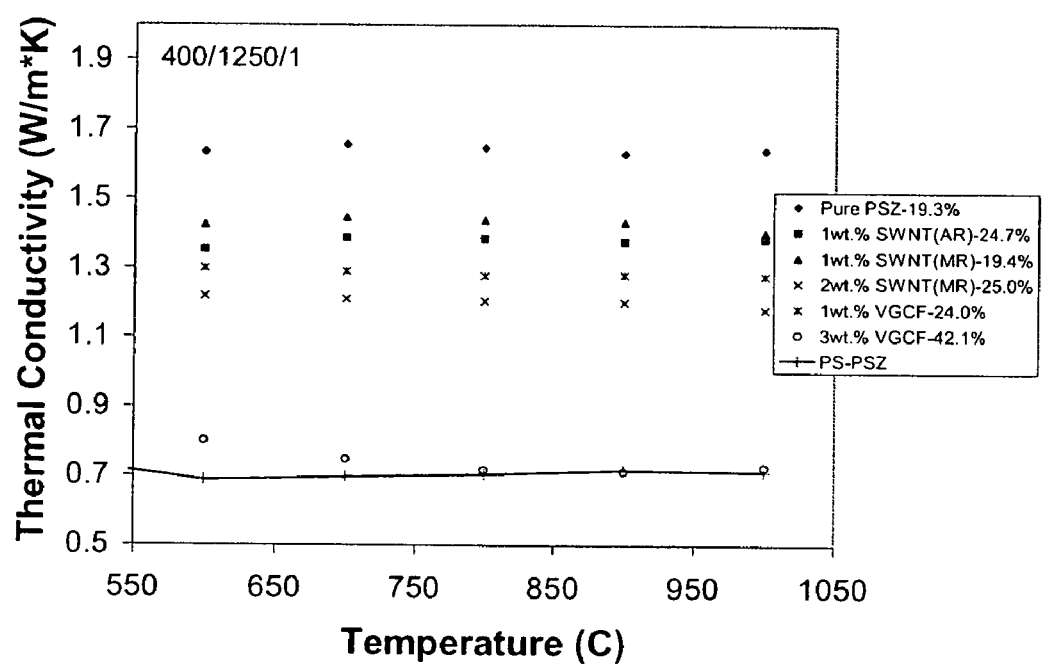
FIG. 9. Reduction of thermal conductivity of partially stabilized zirconia as a result of adding single-wall carbon nanotubes or vapor-grown carbon fibers at a variety of loadings. Post 400° C. binder burnout and 1250° C. sintering for 1 hour.
Figure 10:
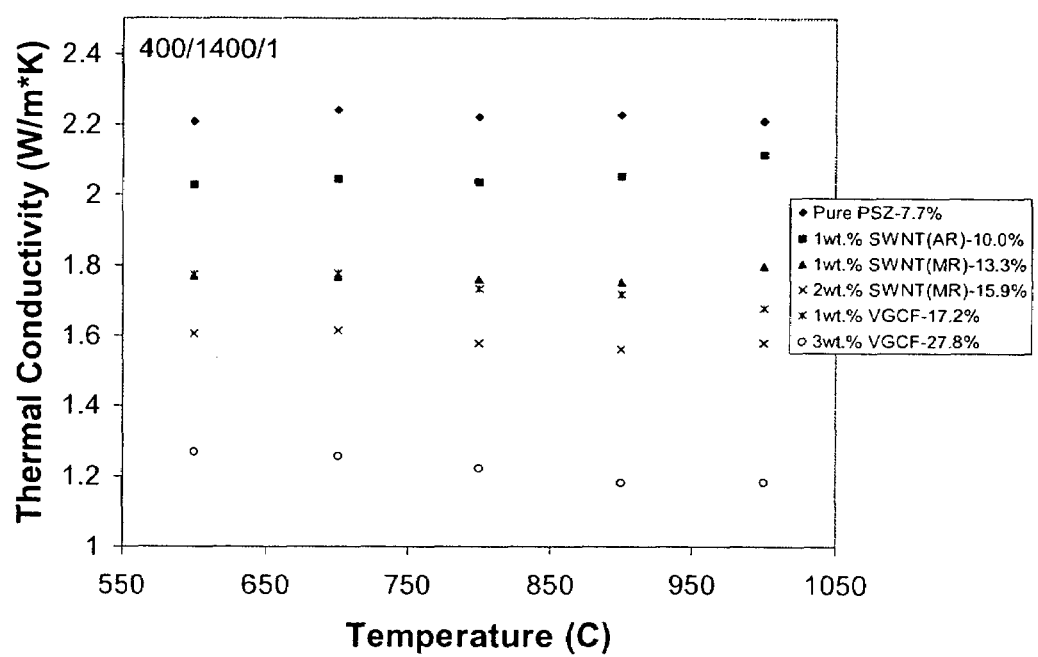
FIG. 10. Reduction of thermal conductivity of partially stabilized zirconia as a result of adding single-wall carbon nanotubes or vapor-grown carbon fibers at a variety of loadings. Post 400° C. binder burnout and 1400° C. sintering for 1 hour.

The burnout and sintering conditions of the resulting ceramic nanocomposite play a fundamental role in determining the porosity of the final product, as shown in FIG. 5. With respect to the production of ceramic composites containing SWNTs or VGCFs, binder burnout is tremendously important since the additives must survive the burnout process in order to come into close contact with the ceramic particles and have an eventual impact on the microstructure of the final product. Since binder burnout in air occurs in the same general temperature range as SWNT degradation (375-450° C., from TGA analysis), it is crucial to select a heat treatment process which preserves the integrity of the nanostructured carbon materials as long as possible. Metal content in SWNTs reduces the degradation temperature. Hence, in some embodiments it is removed.

In embodiments of the present invention wherein the nanostructured carbon material comprises SWNTs, characterization techniques are preferably employed to: (1) determine whether nanotubes survived intact through the binder burnout portion of the heat treatment, and (2) determine the effect of the nanotube's presence on the microstructure of the final partially sintered material. It has been determined that both SWNTs and VGCFs remained intact long enough for the formation of new nanoscale features (structures). SWNT survivability is dependent upon the presence of metals.

Thermal properties of nanocomposite ceramic materials vary significantly with the amount, type, and dispersal of nanostructured carbon material incorporated into the ceramic matrix, and with the burnout and sintering conditions employed. Thermal conductivity reductions can range from about zero to well over 50%. FIGS. 6-10 illustrate this in graphical form for $C_{60}$, SWNTs, and VGCFs in partially stabilized zirconia (PSZ). Note that thermal conductivity measurements used to generate these figures were made using a laser flash thermal diffusivity system (SWNTs and VGCFs) or a hot strip method ($C_{60}$).

Figure 11:
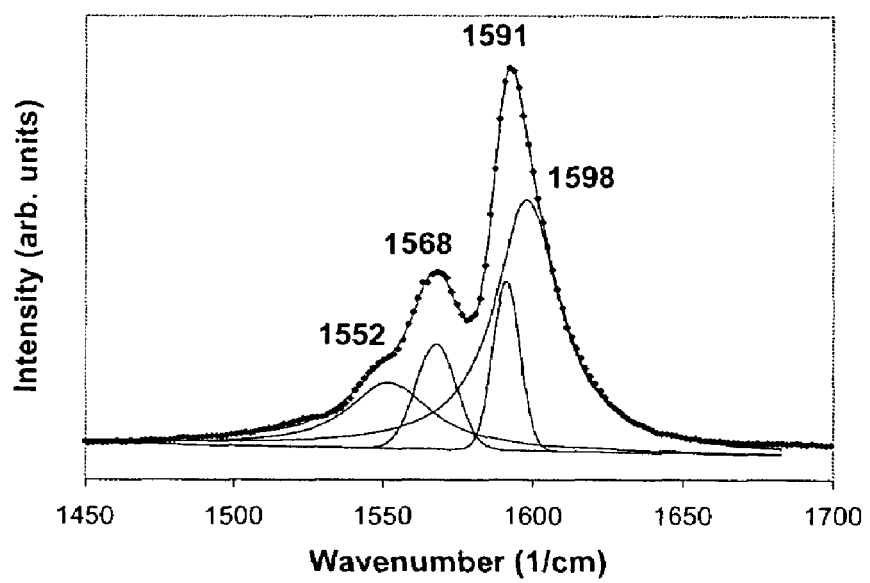
FIG. 11. Raman spectrum of purified single-wall carbon nanotubes in partially stabilized zirconia matrix before sintering.
Figure 12:
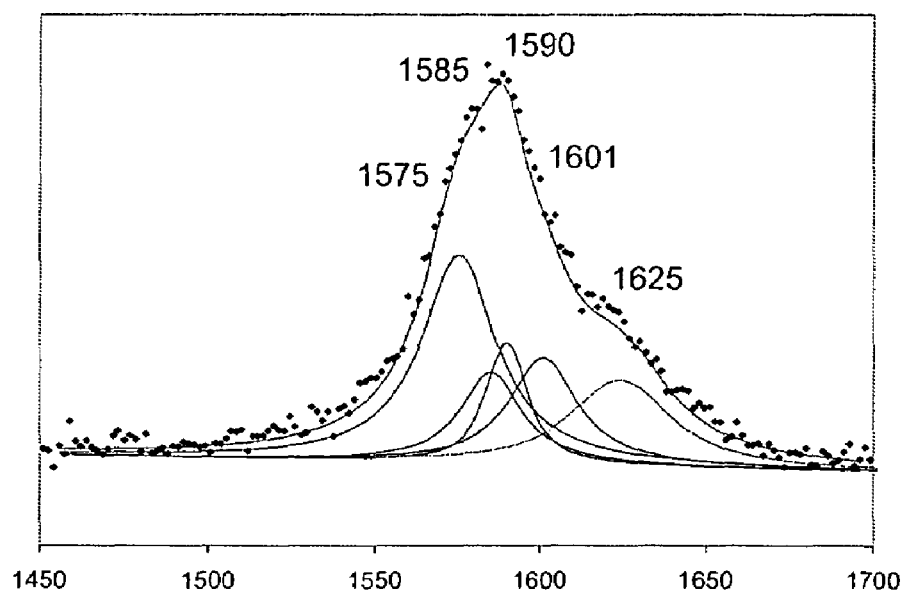
FIG. 12. Raman spectrum of purified single-wall carbon nanotubes in partially stabilized zirconia matrix after sintering at 1100° C. for 12 hours.
Figure 13:
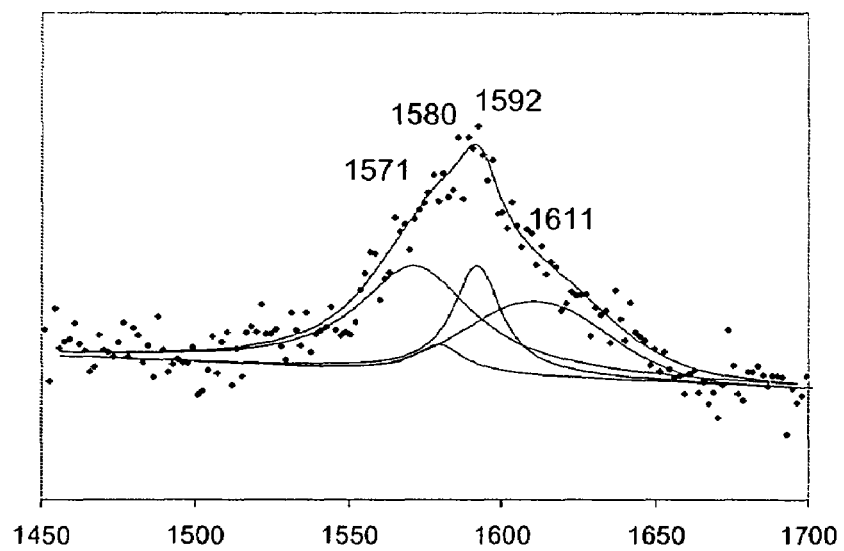
FIG. 13. Raman spectrum of purified single-wall carbon nanotubes in partially stabilized zirconia matrix after sintering at 1400° C. for 1 hour.
Figure 14:
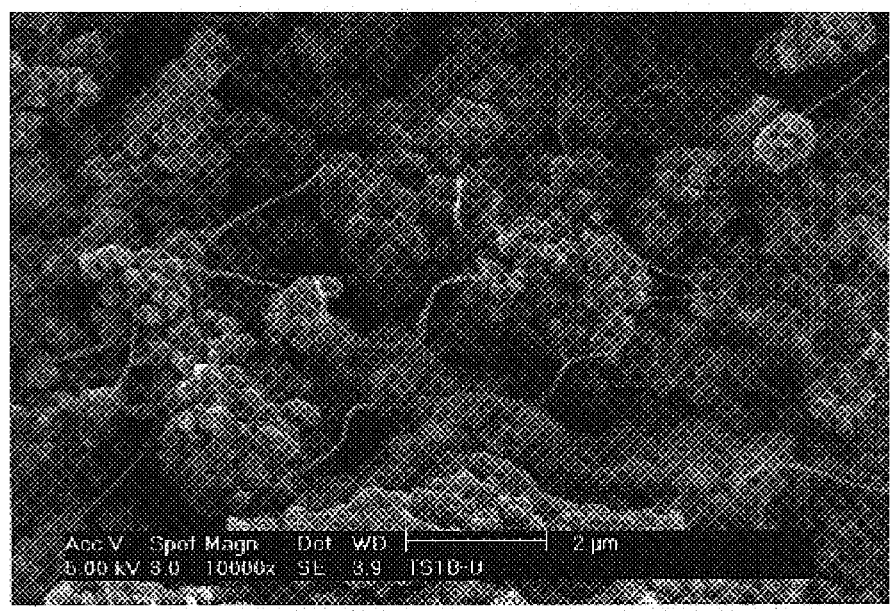
FIG. 14. Scanning electron microscope image of single-wall carbon nanotubes in partially stabilized zirconia matrix before binder burnout or sintering.
Figure 15:
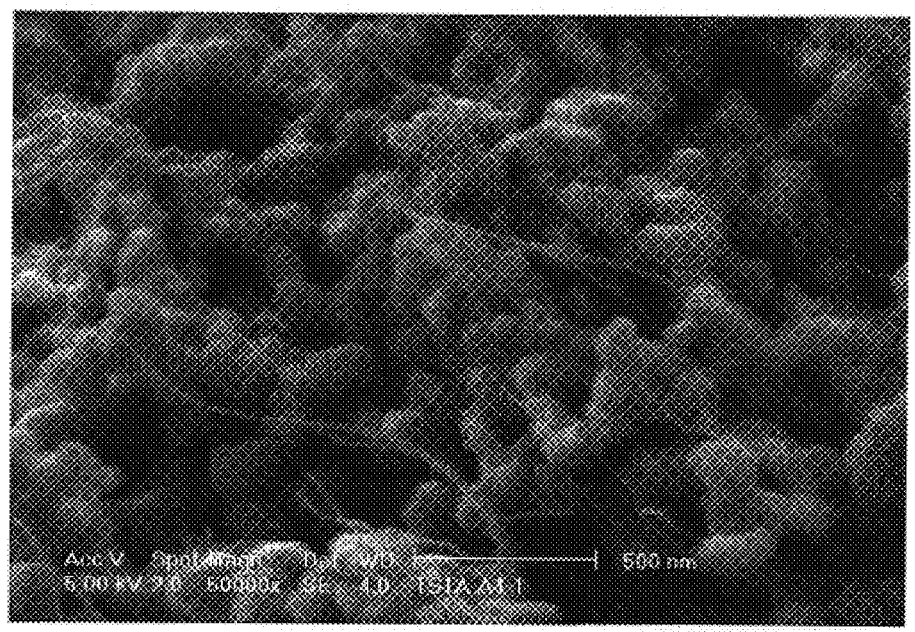
FIG. 15. Scanning electron microscope image of single-wall carbon nanotubes in partially stabilized zirconia matrix after binder burnout but before sintering.
Figure 16:
FIG. 16. Transmission electron micrograph of single-wall carbon nanotubes in partially stabilized zirconia matrix after binder burnout and sintering at 1100° C. for 12 hours. Notice that a good number of single-wall carbon nanotubes have survived.

In some cases, nanostructured carbon material is destroyed during the sintering process. FIGS. 11-13 are Raman spectra of SWNTs in a PSZ matrix which illustrate the survivability of SWNTs where the growth catalyst has been removed (creating a higher level of survivability) before sintering (FIG. 11), sintering at 1100° C. for 12 hours (FIG. 12), and sintering at 1400° C. for 1 hour (FIG. 13) (The continued presence of a peak at about 1591 cm$^{-1}$ confirms survivability). FIGS. 14 and 15 are scanning electron microscopy (SEM) images of SWNTs in PSZ before firing (FIG. 14), after binder burnout (FIG. 15). FIG. 16 is a transmission electron microscope image after sintering at 1100° C. for 12 hours.

EXAMPLES

The following examples are provided by way of illustration only and not by way of limitation. A variety of parameters can be changed or modified to yield essentially similar results and would be apparent to one skilled in the art.

Example 1

Robocasting of VGCF and SWNT Ceramic Composites

The successful robocasting of any part is directly related to slurry characteristics. This example, therefore, focuses on the process optimization of the composite slurries in order to successfully robocast solid parts. Developing a slurry for robocasting is highly dependent upon experience with colloidal processing of aqueous ceramic suspensions near the dilatant regime. The slurry processing window is very small and expert judgement must be exerted when identifying the appropriate slurry conditions for robocasting. During the development of a robocastable slurry, changes through Newtonian, pseudoplastic and dilatant slurries can easily be observed but identifying the robocasting slurry conditions, just bordering dilatancy, takes practice. Although robocasting technology has already proven to be widely applicable to many ceramic systems (Cesarano et al.) the area of ceramic nanocomposite processing has yet to be explored.

In this example, vapor grown carbon fibers (VGCFs) were selected to process with silicon nitride particles in order to foreshadow any processing issues arising during the development of the CNT/silicon nitride slurry. VGCFs have fiber lengths from 50.0 µm—100.00 µm and a diameter of around 0.1 µm. VGCFs are comparable in size to CNT bundles, which are individual CNTs that are bundled around each other by van der Waals forces. The VGCF/silicon nitride slurry was developed using an anionic polyelectrolyte, Darvan 821A. Polyelectrolytes are widely known for their ability to disperse ceramic particles well (Cesarano et al., "Processing of Highly Concentrated Aqueous alpha-Alumina Suspensions Stabilized with Polyelectrolytes," *J. Am. Ceram. Soc.*, 71 (12), 1062-1067 (1998)). Two —CNT/silicon nitride slurries were developed using different dispersants in order to identify which dispersant homogeneously disperses CNTs and ceramic particles while maintaining a highly concentrated vol. % solids aqueous suspension, suitable for robocasting. The two dispersants used were Darvan 821A and cetyltrimethylammonium bromide (CTMAB), a cationic surfactant. CTMAB is a widely studied surfactant system that has already been shown to disperse CNTs in aqueous solution where the suspension is a uniform black color throughout and does not settle out over long periods of time (Hwang et al.). The development of a highly concentrated silicon nitride aqueous suspension using CTMAB as the dispersant is quite novel. Therefore the optimization of a CNT/silicon nitride slurry suitable for robocasting is being investigated in order to produce homogeneously dispersed CNTs throughout the silicon nitride matrix.

A commercial blend of $Si_3N_4$ powder (GS-44 $Si_3N_4$, AlliedSignal Inc., Torrance, Calif.) and carbon nanofibers (VGCFs and CNT bundles) were used to develop the composite systems. The $Si_3N_4$ powder contained less than 10.0 vol. % sintering additives, an average particle diameter and specific area of 0.77 µm and 7.7 $m^2$/g, respectively (He et al., "Robocasting and Mechanical Testing of Aqueous Silicon Nitride Slurries," *Proceeding of the Materials Research Society*, 627-635, (2000)). Darvan 821A (DV), an anionic polyelectrolyte, (R.T. Vanderbilt Company Inc., CT) was used to disperse the ceramic powder at approximately 1.0 wt. % to ceramic powder. A dispersed suspension of $Si_3N_4$ powder (fluid like/Newtonian flow) was reached at pH 8.5 at which point carbon nanofibers were added to the suspension. Purified VGCFs (Applied Sciences Inc., Cedarville, Ohio) were used to develop a 45.0 vol. % solids VGCF/DV/$Si_3N_4$ composite system containing 1.3 vol. % VGCFs. Purified CNT bundles (Carbon Nanotechnologies Incorporated, Houston, Tex.) were used to develop a CNT/DV/$Si_3N_4$ composite. Minor adjustments to the pH were made, after addition of the carbon nanofibers, by adding small amounts of 1.5M $Al(NO_3)_3$ to the composite suspensions in order to tailor them for robocasting. Robocast suspensions for VGCF/DV/$Si_3N_4$ and CNT/DV/$Si_3N_4$ were achieved at pH 8.0 and 8.2, respectively. CTMAB was used to develop a 44.0 vol. % solids CNT/CTMAB/$Si_3N_4$ composite containing 1.0 vol. % CNT bundles. Approximately 0.5 wt. % surfactant was used and 1.5 M $Al(NO_3)_3$ was added in small increments until the $Si_3N_4$ powder was dispersed (fluid like/Newtonian flow) at pH 4.0. After addition of the CNT bundles, the suspension was adjusted for robocasting by adding small increments of 1.5 M $Al(NO_3)_3$. A paint shaker was used to homogeneously mix all the composite suspensions in between processing steps. Table 1 shows the suspension and robocast properties.

TABLE 1

Properties of Silicon Nitride Aqueous Suspensions Dispersed with VGCFs and CNTs

| Composite System | VGCF/ DV*/$Si_3N_4$ | CNT/DV*/ $Si_3N_4$ | CNT/ CTMAB*/$Si_3N_4$ |
|---|---|---|---|
| Volume % solids | 45 | 40 | 44 |
| Volume % carbon reinforcements | 1.3 | 0.4 | 1.0 |
| Weight % dispersant to powder | 1.0 | 1.0 | 0.5 |
| pH of dispersed $Si_3N_4$ suspension | 8.5 | 8.5 | 4.0 |
| pH of robocast suspension | 8.0 | 8.2 | 6.0 |

*DV: Darvan 821A
CTMAB: cetyltrimethlyammonium bromide

Solid rectangular parts (25 mm×10 mm×5 mm) were robocast from a 10 cc syringe with a 0.84 mm inner diameter tip. The table speed of the platform was 10 mm/sec and the parts were built under an oil bath. Each solid part was built in less than six minutes and followed a length wise, layer-by-layer building pattern. The robocast parts were dried overnight before high temperature sintering. Composite parts were packed into a graphite crucible within a powder bed of a blend of 50 wt. % $Si_3N_4$ boron nitride powder. The furnace was pre-evacuated to 100 millitorr before all sintering runs. The furnace temperature was ramped up and down at a rate of 10° C./min. The samples were held at 1740° C. for one hour under ultra-high purity nitrogen gas at a pressure of two psi over normal atmospheric. Composite parts were fractured by hand at room temperature, before sintering, and evaluated for carbon nanofiber dispersion under a high-resolution scanning electron microscope (SEM).

Figure 17:
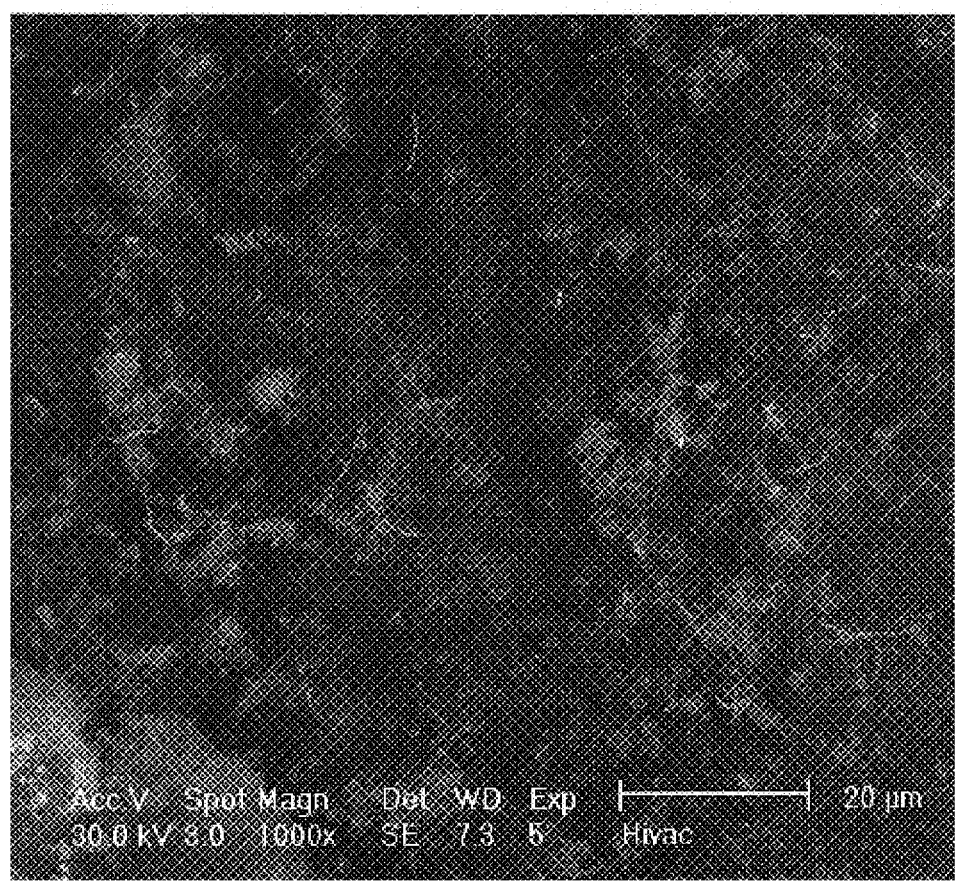
FIG. 17. An scanning electron microscope (SEM) image of a VGCF/DV/$Si_3N_4$ composite fracture surface showing uniform VGCF dispersion throughout the surface.
Figure 18:
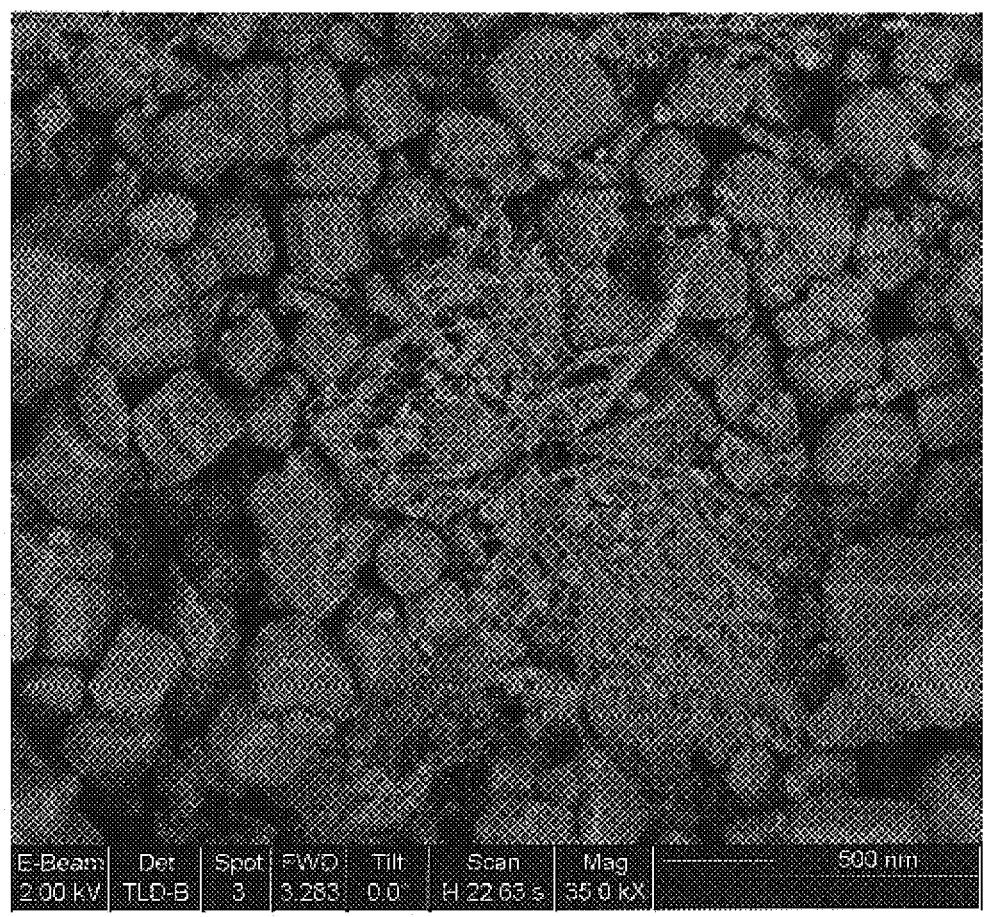
FIG. 18. An SEM image of a CNT/DV/$Si_3N_4$ composite, before sintering, with 1.0 volume percent CNTs showing an example of poor CNT dispersion in the form of a tangled CNT bundles seen throughout the sample.
Figure 19:
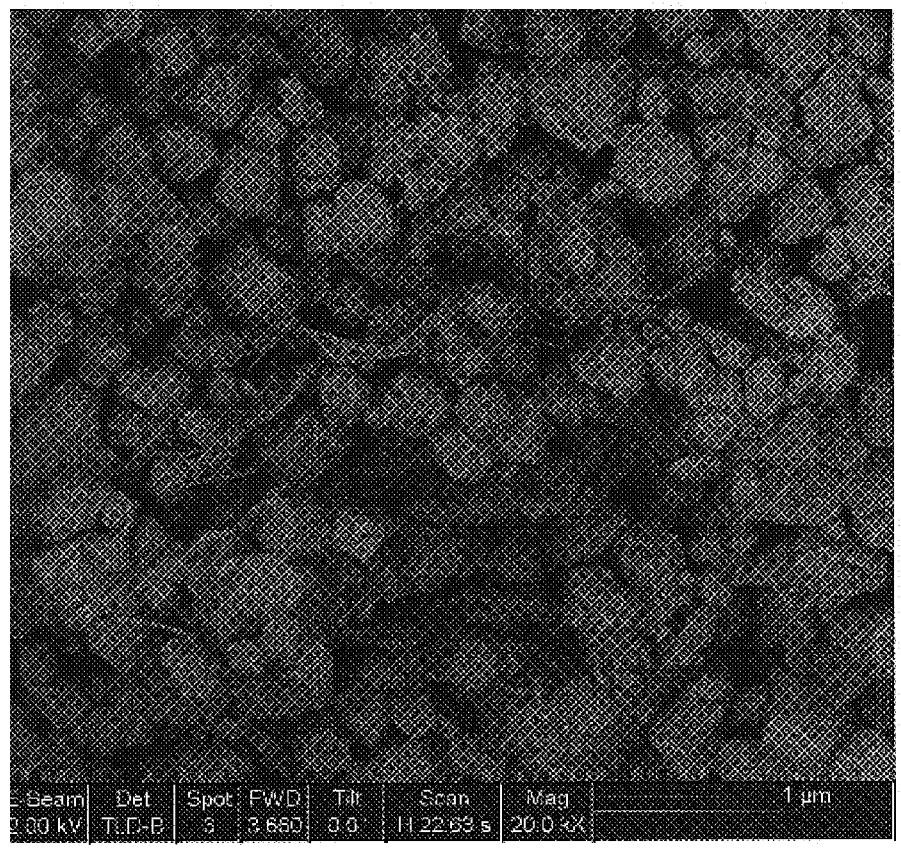
FIG. 19. An SEM image of a CNT/CTMAB/$Si_3N_4$ composite, before sintering, with 1.0 vol. % CNTs, showing dispersed CNT bundles.
Figure 20:
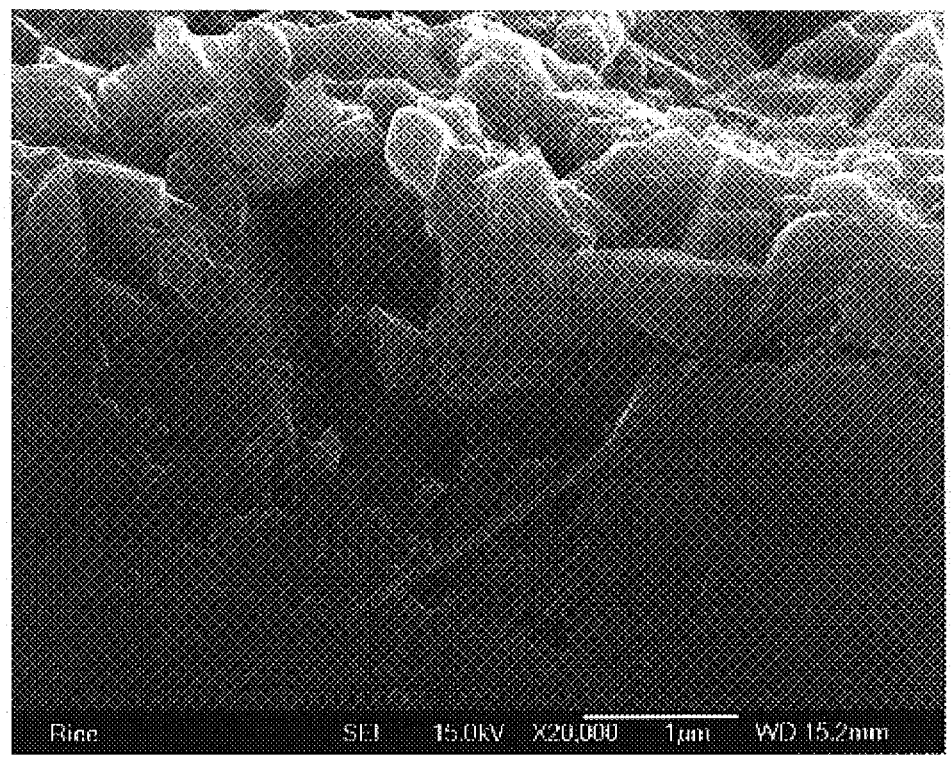
FIG. 20. An SEM image of a CNT/CTMAB/$Si_3N_4$ composite, after sintering, with 1.0 vol. % CNTs.

Highly concentrated aqueous $Si_3N_4$ suspensions with VGCFs and SWNTs were developed as slurries suitable for robocasting. Slurry preparation involved multiple steps, first the aqueous suspension was highly dispersed as a very fluid like (Newtonian flow) slurry, then dry nanofibers were added, electrolytic adjustments were then made in order to obtain a suitable slurry for robocasting. In between each processing step, copious amounts of shaking, using a paint shaker, were performed in order to homogenously mix the suspension. Solid composite parts were successfully robocast from these aqueous suspensions with the following compositions, VCGF/DV/$Si_3N_4$, CNT/DV/$Si_3N_4$, and CNT/CTMAB/$Si_3N_4$. Ceramic particles and VGCFs were able to achieve a high level of dispersion in suspension using DV as the dispersant. FIG. 17 shows a fracture surface of the VGCF/DV/$Si_3N_4$ composite where a uniform distribution of VGCFs can be observed throughout the surface, which was representative of the entire sample surface. As for the level of CNT bundles dispersed within ceramic particles using DV as the dispersant; CNT bundle dispersion throughout the ceramic matrix was considerably low. FIG. 18 shows a tangled mass of CNT bundles along the fracture surface of the CNT/DV/$Si_3N_4$ composite. The tangled mass occurrences were common throughout the composite surface, along with regions bare of CNT bundles. Two different dispersant systems DV and CTMAB were used in the development of the CNT composites in order to develop an understanding about CNT dispersion within ceramic particles. The CNT/CTMAB/$Si_3N_4$ composite showed CNT bundles dispersed throughout the composite parts and with very few tangles of CNT bundles were found. FIG. 19 shows a fracture surface of a CNT/CTMAB/$Si_3N_4$ composite where CNT bundles can be seen weaving in and out of the ceramic matrix. It is expected that the cationic surfactant CTMAB shows potential for developing aqueous suspension of CNTs and ceramic particles with highly dispersed CNT bundles within the ceramic slurries. FIG. 20 shows an SEM image of a CNT/CTMAB/$Si_3N_4$ composite, after sintering, with 1.0 vol. % CNTs.

Example 2

Tape-Casting Composites of Partially Stabilized Zirconia with SWNTs and VGCFs

The following procedure is used to produce a homogeneous, partially-stabilized-zirconia (PSZ) tape. Based on a final 100 g slip, the solvent (31 g) consists of a mixture (80/20 by weight) of toluene and ethanol. The dispersant (2 g) is a 50/50 mixture of solvent and Manhedan Fish Oil (Tape Cast Warehouse (TCW)) which was added and mixed with the solvent along with equal amounts (2.5 g) of the plasticizers, polyethylene glycol 400 (Alfa) and butyl benzyl phthalate (TCW). To this liquid, 58 g of PSZ powder was added slowly while stirring intermittently. Partially stabilized zirconia (HSY3.0, American Vermiculite) with 3.0 mol. % $Y_2O_3$ and an average particle size of 0.41 microns was selected for this experiment. Spherical zirconia milling media were added to the container, and the slurry was ball milled for approximately five hours. An appropriate amount (appropriate to the desired amount in the final product) of SWNTs were added in the second hour of this operation. Polyvinyl butyral—B98 (TCW) was selected as the binder (4 g) and was added to the slurry in ¼ increments, with intermittent shaking and stirring. The final ball milling operation was then conducted for an additional five hours (more if necessary in composite slurries, depending on the homogeneity of the mixture). Degasing of the "slip" was performed on a vibrating table, in a vacuum chamber, or by sonication. After degasing, the slip was poured on to a sheet of Mylar® which was fixed to a flat surface. Then, a straight edge (doctor blade) with a surface-to-edge spacing of ~200 microns was moved at ~20 cm/min across the slurry to create a thin flat uniform ceramic tape. After the solvent had evaporated and the tape was dry, it was cut to its desired shape and prepared for heat treatment. In order to create samples with thicknesses in excess of 200 microns it was necessary to produce multi-layer laminates. Two-layer tapes were made by pressing at 2000 psi and 85° C. for 15 minutes.

Thermogravimetric analysis (TGA) was conducted to determine the optimum temperature profile for binder burn-out while preserving the nanotubes (VGCFs oxidize at higher temperature than this particular batch of purified SWNTs). A final burnout temperature of 400° C. in air (with a one hour hold) was selected as result of this study, and in order to minimize cracking and excessive stresses during heat treatment, a slow heating rate (1° C./min) was used. Partial sintering was then achieved in partial vacuum (~10 millitorr), which increased the probability of the nanotube's survival. The nanotubes must remain intact long enough to have an effect on the microstructure of the ceramic. A final sintering temperature of 1100° C. was selected in order to achieve a partially sintered state, which, like plasma sprayed thermal barrier coatings, results in a substantial amount of porosity.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the methods described herein without departing from the concept, spirit, and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope, and concept of the invention as defined by the appended claims.

What is claimed is:

1. A method of protecting a surface of an object with a thermal barrier, the method comprising:
    providing a mixture comprising (a) a ceramic host material and (b) a nanostructured carbon material selected from the group consisting of single-wall carbon nanotubes, multi-wall carbon nanotubes, vapor grown carbon fibers, fullerene molecules, carbon fibrils, buckyonions, nested fullerenes, endohedral fullerenes, metallofullerenes, and combinations thereof;
    heating the mixture so as to form a ceramic nanocomposite having a nanoporous structure; and coating the surface of the object with said ceramic nanocomposite.

2. The method of claim 1, wherein the ceramic nanocomposite further comprises material properties selected from thermally insulating, electrically conducting, mechanically robust, and combinations thereof.

3. The method of claim 1, wherein the object comprises at least a portion of a gas-turbine engines.

4. The method of claim 1, wherein the nanoporous structure comprises a nanostructured carbon material;
    wherein the nanostructured carbon material decreases the thermal conductivity of the ceramic material.

5. The method of claim 4, wherein the nanostructured carbon material serves to decrease the thermal conductivity of the ceramic material by serving as a phonon scattering center.

6. The method of claim 4, wherein the nanostructured carbon material serves to decrease the thermal conductivity of the ceramic material by making the material more amorphous.

7. The method of claim 4, wherein the nanostructured carbon material serves to decrease the thermal conductivity of the ceramic material by making the ceramic material more porous.

8. The method of claim 4, wherein the nanostructured carbon material serves to decrease the thermal conductivity of the ceramic material by creating point defects.

9. The method of claim 4, wherein at least some of the nanostructured carbon material present imparts greater structural integrity to the ceramic material.

10. The method of claim 4, wherein at least some of the nanostructured carbon material is derivatized.

11. The method of claim 1, wherein the step of coating involves spraying.

12. The method of claim 1, wherein the ceramic nanostructure comprises a bulk porosity ranging from 1% to 60%.

* * * * *